United States Patent [19]
Case

[11] 4,440,125
[45] Apr. 3, 1984

[54] DIESEL ENGINE COMBUSTION CHAMBER

[75] Inventor: James L. Case, Okemos, Mich.

[73] Assignee: General Motors Corporation, Detroit, Mich.

[21] Appl. No.: 264,472

[22] Filed: May 18, 1981

[51] Int. Cl.³ .............................................. F02B 19/08
[52] U.S. Cl. .................................. 123/293; 123/263; 123/286
[58] Field of Search ............... 123/293, 263, 262, 286, 123/291

[56] References Cited

U.S. PATENT DOCUMENTS

| 3,957,021 | 5/1976 | Loyd, Jr. | 123/286 |
| 4,122,804 | 10/1978 | Kingsbury et al. | 123/263 |
| 4,122,805 | 10/1978 | Kingsbury et al. | 123/263 |
| 4,182,287 | 1/1980 | Yagi et al. | 123/293 |
| 4,270,499 | 6/1981 | Frelund | 123/293 |
| 4,294,208 | 10/1981 | Wagner | 123/286 |

FOREIGN PATENT DOCUMENTS

G14490 9/1956 Fed. Rep. of Germany ...... 123/263
1031574 6/1958 Fed. Rep. of Germany .

Primary Examiner—Andrew M. Dolinar
Attorney, Agent, or Firm—Robert J. Outland

[57] ABSTRACT

An improved diesel combustion chamber of the prechamber type wherein a dual opening passage connecting the main and precombustion chambers has a large area base section below the dual openings to the prechamber and a restricted venturi between the base section and the outlet to the main chamber. In a preferred embodiment, narrowed channels in the head and piston connect with the narrowed outlet of the prechamber passage to aid further penetration across the main chamber of gas forced out through the venturi by increased pressures and combustion in the prechamber and the wide passage base portion.

8 Claims, 3 Drawing Figures

DIESEL ENGINE COMBUSTION CHAMBER

TECHNICAL FIELD

This invention relates to diesel engines and more particularly to combustion chambers including precombustion chambers for use in diesel engines. In its more particular aspects the invention relates to improved combustion chamber and precombustion chamber arrangements for automotive diesel engines.

BACKGROUND

Among the many types of diesel engine combustion and precombustion chamber arrangements which have been utilized by various engine manufacturers is one shown in U.S. Pat. Nos. 4,122,804 Kingsbury, Thurston and Chapman and 4,122,805 Kingsbury and Thurston, both assigned to the assignee of the present invention. A more recent modification in current automotive engine use is shown in U.S. patent application Ser. No. 35,533 Frelund, filed May 3, 1979, now U.S. Pat. No. 4,270,499 and also assigned to the assignee of the present invention.

Both of the aforementioned prior arrangements utilize a relatively large and wide side-opening passage that extends through the floor of the precombustion chamber (prechamber) to connect the prechamber with the main combustion chamber. The passage size and arrangement are such as to provide moderate swirl in the prechamber and promote efficient combustion therein. In the modification of Ser. No. 35,533 there is provided a secondary opening angled acutely from an intermediate point of the flame cup passage to the prechamber to provide early discharge of burning air-fuel mixture into the connecting passage and thence into the combustion chamber. In both prior arrangements, a wide channel in the cylinder head connects the prechamber floor passage with recesses in the cylinder head and piston under the intake and exhaust valves into which substantial portions of the burning gases are discharged from the prechamber for further mixing with air and combustion in the main combustion chamber.

SUMMARY OF THE INVENTION

The present invention provides a further improved and modified combustion chamber and precombustion chamber arrangement similar in many respects to that of the above-mentioned patent application Ser. No. 35,533. The improved arrangement of the present invention has given evidence of providing improved combustion with a resultant benefit of reduced exhaust particulates or smoke at an equivalent power levels or an increase in power at an equivalent smoke level. Various features of the improved construction are incorporated to provide this improved performance.

In the present invention, there is retained from the arrangement of Ser. No. 35,533 a side outlet passage in the floor of a flame cup which defines the bottom wall of the precombustion chamber. The passage includes main and branch portions each opening into the precombustion chamber. The main passage portion has a base section beneath the main and branch openings which retains the enlarged relatively wide cross-section configuration of the prior arrangement, thus providing as before a moderate amount of swirl due to inflowing gases passing into the precombustion chamber.

The outward end of the main passage portion, between the branch portion and the side outlet, comprises a venturi formed by smoothly narrowing the sides of the passage to a predetermined minimum at a throat and again widening the passage to an intermediate width at its side outlet. The channel in the cylinder head is also narrowed to the intermediate width of the venturi at the side outlet. Also, the channel extends further across the cylinder head and cooperates with an opposing short channel in the piston to carry combustion gases from the prechamber passage into the main chamber and valve recesses.

The moderate flow restriction of the outlet venturi together with the narrowed flow channels in the cylinder head and piston give evidence of providing increased combustion of prechamber gases in the plenum-like wide base section of the prechamber channel underneath the dual outlets and the intermediate bridge. There also results increased penetration of gases swirling from the precombustion chamber into the main chamber with apparently improved mixing of the gases with main chamber air and improved combustion of the resulting mixture.

In the preferred embodiment, the enlarged base portion of the passage has a cross-sectional area approximately ⅔ larger than that of the venturi throat while the outward end of the venturi at the side outlet of the prechamber passage is approximately ⅓ larger than the venturi throat.

It is theorized that the moderate restriction of the short venturi in the outlet of the prechamber passage has the benefits of not adversely interfering with the inflow of gases into the prechamber and of not substantially increasing swirl in the prechamber due to the relatively large cross-section of the plenum-like base section and opening portion of the main passage into the prechamber. On the other hand, out-flowing gases are moderately restricted by the venturi which causes greater burning to take place in the base portion of the passage in the bottom wall. This increases the pressure so that gases forced out through the venturi throat exit at a much greater velocity into the narrowed head and piston channels and therefore obtain much greater penetration of the burning gases across the main chamber and with better mixing and combustion with main chamber air.

These and other features and advantages of the present invention will be more fully understood from the following description of a preferred embodiment taken together with the accompanying drawing.

BRIEF DRAWING DESCRIPTION

In the drawing

DETAILED DESCRIPTION

Figure 1:
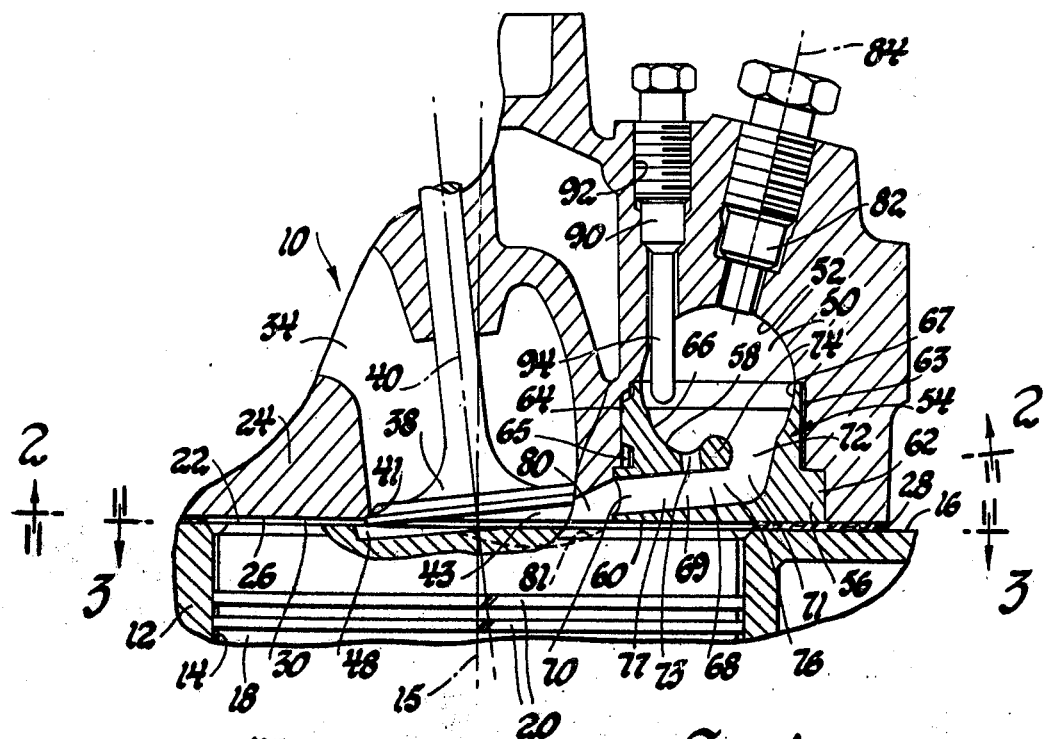
FIG. 1 is a fragmentary transverse cross-sectional view through a cylinder of an internal combustion diesel engine formed in accordance with a preferred form of the invention wherein the precombustion chamber portion is sectioned in a plane through the cylinder axis and the exhaust valve port is sectioned along the valve axis.
Figure 2:
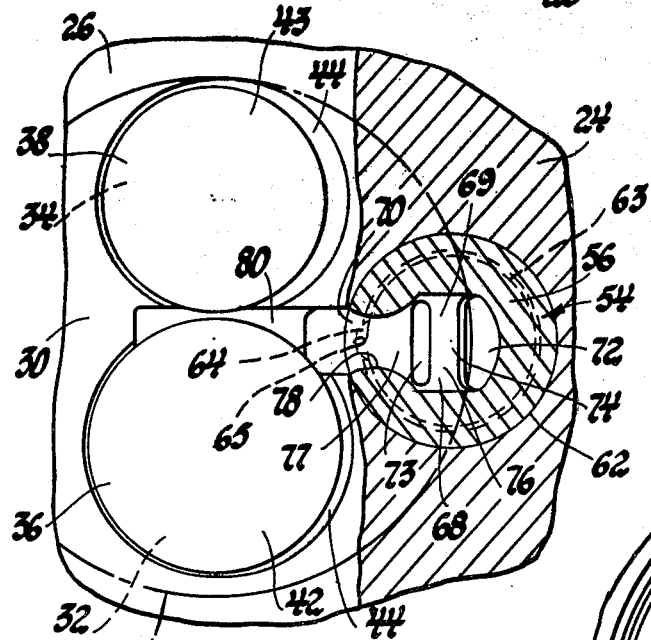
FIG. 2 is a cross-sectional view through the combustion chamber of the disclosed embodiment taken generally in the plane indicated by the line 2—2 of FIG. 1.
Figure 3:
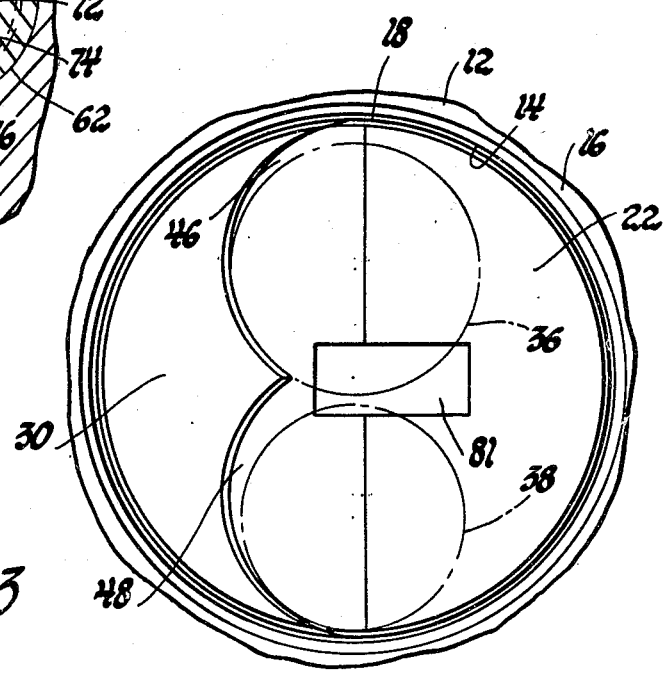
FIG. 3 is a plan view of the cylinder block and piston of the disclosed embodiment as seen from the plane indicated by the line 3—3 of FIG. 1.

Referring now to the drawing in detail, numeral 10 generally indicates an internal combustion engine of the four-stroke automotive diesel type. Engine 10 is conventionally provided with a cylinder block 12 defining a plurality of cylinders 14 having axes 15, only one of the cylinders being shown. Each of the cylinders opens through an end wall of the cylinder block 12 which defines a flat machined surface 16. Each cylinder has reciprocably disposed therein a piston 18 having the usual piston sealing rings 20 and having a generally flat upper surface 22 which, in the upper position of motion of the piston known as the top dead center position, approximates a location of near alignment with the upper surface 16 of the cylinder block.

At least one cylinder head 24 is mounted on the cylinder block 12 having a generally flat lower surface 26 opposing and sealingly engaging through a gasket 28 the flat upper surface 16 of the cylinder block. The flat head surface 26 also closes the end of each cylinder 14 and, lying opposite the flat piston surfaces 22, defines together with the pistons and cylinders main combustion chambers 30 located at the ends of the cylinders 14.

At each cylinder location the cylinder head 24 is provided with a pair of adjacent ports including an inlet port 32 and an exhaust port 34. These ports respectively connect the main combustion chamber 30 with suitable air inlet and exhaust gas discharge systems, not shown. The movement of gas between the ports and the main combustion chamber is controlled respectively by inlet and exhaust poppet valves 36, 38 respectively having heads seatable at the ends of their respective ports to close the ports.

The valves 36, 38 are carried in the head for reciprocating movement on parallel axes 40 which are canted or inclined upwardly away from a plane passing through the cylinder axis 15 and preferably extending longitudinally of the engine. The canting of the valves requires the valve seats 41 in the cylinder head to be recessed on one side, resulting in the formation of wedge-shaped valve recesses 42, 43 which are defined by the bottoms of the valves and the surrounding wall portions 44 tapering into the adjoining flat surface 26 of the cylinder head. These valve recesses are complemented by similar, though equally sized, wedge-shaped recesses 46, 48 formed in the flat upper surface of each piston to provide clearance for the initial opening or final closing motions of the heads of the respective valves. The valve recesses in the head and their related recesses in the pistons cooperate to form adjoining and overlapping pancake or disc-like air turbulence valve pockets between the ends of the valves and the tops of the pistons having elevated sides formed largely within the cylinder head.

At each cylinder location, the cylinder head is provided with a precombustion chamber (prechamber) 50 which is located in the head above one edge of the piston and on the side of the inlet and exhaust ports opposite the direction of upward inclination of their valve axes 40. Each precombustion chamber 50 is formed in the head by a recess 52 that extends upwardly from the cylinder head bottom surface 26 and is closed at the bottom by a flame cup insert 54.

The flame cup insert comprises a unitary body having a floor (or bottom wall) portion 56 with upper and lower surfaces 58, 60 respectively and flanged outer edge 62 interference fitted in a complementary portion of the prechamber recess 52 to retain the insert in the head. A portion of the insert floor lower surface 60 opposes the upper surface 16 of the cylinder block and engages the gasket 28 so as to positively retain the insert 54 in the cylinder head after the engine is assembled. The remainder of the insert floor lower surface 60 extends above the cylinder in opposition to the flat upper piston surface 22. It should be noted that the full extent of the lower surface 60 is unbroken by any opening.

Supported on the floor, the unitary flame cup further includes an upstanding cylindrical wall 63, the outer surface of which is conventionally spaced a small amount from the corresponding cylindrical portion of the recess 52 to provide an insulating barrier that tends to retain heat in the wall portion 63. A part cylindrical protrusion 64 cast on the exterior of the wall 63 mates with a vertical drilled recess or slot 65 in the wall of the head recess 52 to positively locate the flame cup in the desired position. The interior of the wall 63 is curved and smoothly connected with the upper surface 58 of the floor to define a cup-shaped interior chamber portion 66. At its upper edge 67, the wall interior has a part spherical portion. This portion opens to and blends with the upper portion of the recess 52 which is of part spherical configuration to form the total volume of the precombustion chamber 50.

Those portions of the construction so far described are essentially the same as the comparable portions of the combustion chamber arrangement disclosed in the above-mentioned U.S. Pat. Nos. 4,122,804 and 4,122,805 and application Ser. No. 35,533. The improvements of the present invention are embodied in features of the connecting passage and channels to be subsequently described, taken together with the above-described features.

The prechamber 50 is connected with the main combustion chamber 30 through the prechamber bottom wall or floor 56 by a gas passage 68. Passage 68 includes a main portion 69 extending laterally in the flame cup floor at a slight upward angle between the upper and lower surfaces 58, 60 from an opening 70 in the side of the floor to a junction point 71 beyond the center of the floor. Here the main portion turns upwardly to include a primary opening portion 72 that opens through the upper surface 58 of the floor to the interior of the precombustion chamber along the side thereof furthest from the cylinder axis. The primary opening portion 72 forms an obtuse angle with the laterally extending part of the gas passage main portion 69, the positioning and angle of the primary opening portion being chosen to direct and control the rate of air swirl created in the precombustion chamber by the inflow of air through the passage from the main chamber during the reduction in clearance volume that takes place during the piston compression stroke.

Gas passage 68 further includes a branch portion 73 that connects the main portion 69 with the prechamber 50 at an intermediate point of the main portion between the junction 71 and opening 70. Branch portion 73 preferably forms an acute angle with the part of the passage main portion extending from the intermediate point to the opening 70. Between the primary opening 72 of the gas passage main portion into the prechamber and the branch portion 73 which forms a secondary opening into the prechamber there extends a bridge 74 that comprises part of the upper portion of the prechamber floor. The bridge extends upwardly above the level of the adjacent floor openings and is rounded to smoothly direct flow into the openings.

The main portion 69 of gas passage 68 is further divided for descriptive purposes into two sections. That portion extending from a point below the branch portion 73 to and including the primary opening portion 72 is referred to as the base section 76. This section is of relatively large cross-sectional area and is substantially wider than deep so as to provide a relatively large passage for gas flow into the prechamber to limit to moderate levels the rate of flow and the resulting swirl in the prechamber. Like the primary opening portion 72, the secondary opening defined by the branch portion 73 is also wide although its cross-sectional area is preferably less than that of the primary opening portion of the base section.

Between the branch portion 73 and the opening 70, the main passage portion defines a venturi section 77. In this section a restrictive venturi is formed by narrowing the width of the passage from the wide configuration of the base portion to a substantially narrower configuration at a throat 78 that forms the most restrictive part of the venturi. Thereafter, the width of the passage widens somewhat to a width at the openings 70 between those of the narrower venturi throat 78 and the wider base section 76.

In the preferred embodiment, it will be noted that the depth or thickness of the main passage portion is substantially uniform over its total length so that only the width varies. In this embodiment, the cross-sectional area of the main portion base section is approximately $\simeq$ larger than the cross-sectional area of the venturi throat 78 which is the most restricted part of the passage. At the opening 70, the venturi section has a cross-sectional area approximately $\frac{1}{8}$ larger than that of the venturi throat.

Also, in the illustrated embodiment, the base section of the gas passage main portion and the prechamber have the relationship of approximately 0.18 square inches of base section cross-sectional area for each cubic inch of volume in the prechamber, including the gas passage. Further, the volume of the prechamber comprises approximately 42.5 percent of the total compressed volume of the combustion and precombustion chambers. These relationships characterize the disclosed embodiment of the dual opening gas passage with inlet venturi formed in the floor of the improved prechamber cup construction.

Extending from the opening 70 of the prechamber gas passage 68, there is formed in the cylinder head a channel 80 which has a width equal to that of the narrowed gas passage opening 70 and a depth which tapers downwardly from a point aligned with the top of the passage outlet 70, merging with the lower surface 26 of the cylinder head at a point substantially beyond the centers of the valve recesses. Below channel 80 the piston is provided with a cooperating channel 81 of equivalent width that extends from a point immediately below the opening 70 near one edge of the cylinder head valve recesses, curving downwardly and then tapering upwardly to end in the piston recesses beyond the cylinder axis. These cooperating channels 80, 81 cooperate with the venturi section 77 of the passage main portion 69 in directing gas flow from the prechamber across the main combustion chamber and into the adjacent valve pockets.

In order to provide a combustible mixture of air and fuel in the precombustion chamber 50, the cylinder head mounts at each cylinder location a fuel injection nozzle 82 which may be of any suitable type but is preferably of the poppet nozzle type that directs a shallow cone-shaped spray of fuel into the precombustion chamber. The nozzle 82 is disposed on an angled axis 84 which lies coplanar with the cylinder axis and extends through the chamber to a point near the location of the secondary opening of branch portion 78 of the prechamber passage. The injection of fuel generally along the axis 84 combined with the swirl existing in the prechamber at the time of injection, causes a concentrated mixture of fuel and air to be formed in a zone of the prechamber immediately adjacent the position of the secondary opening into the prechamber interior portion 66, at which point the beginning of combustion generally occurs.

To provide for ignition under cold-starting and warm-up conditions, a glow plug 90 is provided at each cylinder location. Each plug 90 is secured in an opening 92 having an axis parallel with the cylinder axis and lying in a common plane with the axis of the injection nozzle. Each glow plug has an elongated end 94 that extends into the prechamber in or near the concentrated zone of air-fuel mixture formed in the path of fuel spray from the injection nozzle toward the hot wall, thus providing a hot spot to aid prompt ignition of the fuel delivered to the prechamber by the injector during engine starting and warm-up.

The arrangement of the fuel injection nozzle and glow plug and the configuration of the flame cup connecting passage, working together, create in the precombustion chamber at the end of the compression stroke a rich fuel-air mixture in the zone near the secondary opening, which is ignited by the glow plug or through compression ignition. The resultant combustion creates an increase in pressure which initially causes the first ignited gases to be forced out through the secondary opening to the base section of the main passage portion, followed by the passage of further gases through both the primary and secondary openings to the base section.

The moderate restriction to flow offered by the venturi in the end of the passage main portion apparently slows down the initial outflow of gases from the prechamber and the passage base section momentarily, until increased combustion occurring in the base section and prechamber causes higher pressures. These force the gases at a high rate of flow out through the venturi and through the channels 80, 81 causing deep penetration of the outflowing gases into the opposite side of the main combustion chamber and the adjacent valve recesses where secondary mixing and further combustion occur. In this way the limited restriction offered by the venturi and the extended length and narrowed width of the cylinder head channel and associated piston channel provided greater penetration of outflowing gases into the combustion chamber with more efficient combustion occurring both within the prechamber and subsequently in the main combustion chamber.

The rate of swirl in the prechamber at the end of the compression stroke is controlled primarily by the cross-sectional area and angular orientation of the primary opening of the main passage portion into the prechamber. Flow into the prechamber is preferentially directed through the main passage portion without substantial restriction by the venturi near the outlet. Thus a swirling pattern controlled by the primary opening is directed toward the top of the prechamber, past the injection nozzle and downwardly past the glow plug toward the secondary opening. The combination of controlled swirl and fuel injection direction yields initial combustion in a rich zone near, and an outflow of burning gases through, the secondary opening to the main combustion chamber, as previously described, giving improved combustion with a higher degree of secondary mixing that provide greater power and lower particulate emissions than the levels obtained with prior arrangements.

While the invention has been disclosed by reference to a specific preferred embodiment, it should be understood that numerous modifications to the construction and arrangement of the disclosed embodiment could be made without departing from the inventive concepts defined by the following claims, which should be given the full scope permitted by their respective terms.

The embodiments of the invention in which an exclusive property or privilege is claimed are defined as follows:

1. In combination in a diesel engine, means defining a closed end cylinder, a piston reciprocably carried in the cylinder and defining a main combustion chamber at the closed end of the cylinder, a precombustion chamber formed in the cylinder defining means and closed by a bottom wall, said main combustion chamber being connected with said precombustion chamber by a gas passage through said bottom wall, said passage including main and branch portions, said main portion being of substantially constant depth and having a base section of relatively great width and large cross-sectional area opening into the precombustion chamber to provide controlled swirl and turbulence therein of gas delivered from the main combustion chamber, said branch portion connecting an intermediate point of the main passage portion to an interior zone of the precombustion chamber from which to receive an initial outflow of combustion gases into the gas passage and a venturi section in the main passage portion and extending from the base section, said venturi section being disposed substantially between said intermediate point and an opening to the main combustion chamber, said opening being of lesser width than said base section, and said venturi section having a throat narrower than said opening and smoothly extending to the wider opening and base section to moderately restrict outflow of gases from the precombustion chamber and thereby cause increased combustion in the passage base section and greater penetration of outflowing gases into the main combustion chamber while avoiding excessive restriction to flow in either direction between the main and precombustion chambers.

2. In combination in a diesel engine, means defining a cylinder, a piston reciprocably carried in the cylinder and a cylinder head closing the end of the cylinder and defining in cooperation with the piston a main combustion chamber at the closed end of the cylinder, recesses in the piston and cylinder head defining a pair of air turbulence valve pockets in the main combustion chamber, cooperating channels in the cylinder head and piston to direct gas flow into the valve pockets from a precombustion chamber formed in the cylinder head and defined by a recess in the cylinder head closed by a flame cup having a bottom wall with an unbroken lower surface flush with the lower surface of the cylinder head, said main combustion chamber being connected with said precombustion chamber by a gas passage in said bottom wall, said passage including a main portion extending transversely in the bottom wall from a side opening to a junction point in the wall, and upwardly from the junction point into the precombustion chamber to direct gas flow into the precombustion chamber in a manner to control swirl and turbulence, and a branch portion connecting an intermediate point of said main passage portion between its side opening and the junction point, to an interior zone of the precombustion chamber from which to receive the initial outflow of combustion gases passing through said gas passage, said main passage portion being of substantially constant depth and including a base section of relatively greater width and large cross-sectional area between said intermediate point and said precombustion chamber to provide a plenum-like volume for relatively slow gas flow into the precombustion chamber, said side opening being of lesser width than said base section and equal to the width of the cooperating channels in the cylinder head, and a restricted venturi in said main passage portion between said intermediate point and said side opening and having a throat narrower than said side opening and smoothly extending to the wider side opening and base section to moderately restrict outflow of gases from the precombustion chamber and thereby cause increased combustion in the main passage portion and greater penetration of outflowing gases into the main combustion chamber while avoiding excessive restriction to flow in either direction between the main and precombustion chambers.

3. The combination of either claim 1 or 2 wherein said venturi throat has a minimum cross-sectional area that is between 50 and 65 percent of the cross-sectional area of said base section.

4. The combination of either claim 1 or 2 wherein said venturi throat has a minimum cross-sectional area that is between 50 and 65 percent of the cross-sectional area of said base section and said opening of the main passage portion to the combustion chamber has a cross-sectional area approximately one-third greater than the cross-sectional area of the venturi throat.

5. A flame cup adapted for installation in a diesel engine cylinder head to form part of a precombustion chamber in said head, said flame cup comprising a floor with upper and lower surfaces, the upper surface defining an interior chamber portion, and a gas passage through the floor and connecting with the interior chamber portion, said gas passage comprising a main portion having a lower opening to the exterior of the floor and extending transversely between the upper and lower surfaces to the interior of the chamber, a branch portion extending from an intermediate point of the main passage portion into the chamber at an interior zone from which to receive an initial outflow of combustion gases into the gas passage, said main passage portion being of substantially constant depth and having a base section of relatively great width and large cross-sectional area between said intermediate point and said chamber to control the gas flow rate therein, said lower opening being of lesser width than said base section, and a restrictive venturi between said intermediate point and said lower opening, said venturi having a throat narrower than said opening and smoothly extending to the wider opening and base section to moderately restrict outflow of gases from the precombustion chamber and thereby cause increased combustion in the main passage portion and greater velocity of outflowing gases while avoiding excessive restriction to flow in either direction through the main passage portion.

6. A flame cup adapted for installation in a diesel engine cylinder head to form part of a precombustion chamber in said head, said flame cup comprising a floor with upper and lower surfaces, the lower surface being unbroken and the upper surface defining an interior chamber portion, and a gas passage through the floor and connecting with the interior chamber portion, said gas passage comprising a main portion opening to the exterior of the floor at one side thereof above the lower surface and extending transversely between the upper and lower surfaces to a junction point in said floor and upwardly from the junction point into the chamber to control the resulting swirl and turbulence, and a branch portion connecting an intermediate point of the main passage portion to the chamber at an interior zone from which to receive an initial outflow of combustion gases into the gas passage, said main passage portion being of substantially constant depth and having a base section of relatively great width and large cross-sectional area between said intermediate point and said chamber to control the gas flow rate therein, said side opening being of lesser width than said base section, and a restrictive venturi between said intermediate point and said side opening, said venturi having a throat narrower than said side opening and smoothly extending to the wider side opening and base section to moderately restrict outflow of gases from the chamber and thereby cause increased combustion in the main passage portion and greater velocity of outflowing gases through the side opening while avoiding excessive restriction to flow in either direction through the main passage portion.

7. A flame cup as defined in either claim 5 or 6 wherein said venturi throat has a minimum cross-sectional area that is between 50 and 65 percent of the large cross-sectional area of said base section.

8. A flame cup as defined in either claim 5 or 6 wherein said venturi throat has a minimum cross-sectional area that is between 50 and 65 percent of the large cross-sectional area of said base section and said opening of the main passage portion to the exterior of the floor has a cross-sectional area approximately one-third greater than the cross-sectional area of the venturi throat.

* * * * *